United States Patent [19]
Neal et al.

[11] Patent Number: 5,774,706
[45] Date of Patent: Jun. 30, 1998

[54] HIGH SPEED PCI BUS UTILIZING TTL COMPATIBLE SIGNALING

[75] Inventors: Danny M. Neal, Roundrock, Tex.; Richard A. Kelley, Apex, N.C.

[73] Assignee: International Business Machines Corporation, Armonk, N.Y.

[21] Appl. No.: 766,914

[22] Filed: Dec. 13, 1996

[51] Int. Cl.$^6$ ............................................. G06F 1/08
[52] U.S. Cl. .......................... 395/559; 395/282; 395/555; 395/556
[58] Field of Search ................................. 395/555, 556, 395/559, 281, 282, 653

[56] References Cited

U.S. PATENT DOCUMENTS 5,559,968  9/1996  Stancil et al. ............................. 395/306
5,627,482  5/1997  Lamatsh ..................................... 326/93
5,721,935  2/1998  DeSchepper et al. ............. 395/750.01

OTHER PUBLICATIONS

PCI Local Bus Specification, Revision 2.1 (PCI Special Interest Group, Jun. 1, 1995).

*Primary Examiner*—Ayaz R. Sheikh
*Assistant Examiner*—Jeffrey K. Seto
*Attorney, Agent, or Firm*—Richard A. Henkler; Daniel E. Venglarik; Andrew J. Dillon

[57] ABSTRACT

A PCI local processing system is operated at 50 MHz using 5 V connectors for add-in boards and a 5 V signaling environment with an appropriate timing budget. Only the 5 V add-in boards may be used for 50 MHz adapters installed in the bus. The bus is backward compatible with existing 33 MHz PCI specifications and operates at 33 MHz if a 33 MHz adapter is installed, and will operate at 50 MHz if only 50 MHz adapters and/or 66 MHz adapters which utilize the universal boards are installed.

17 Claims, 3 Drawing Sheets

HIGH SPEED PCI BUS UTILIZING TTL COMPATIBLE SIGNALING

BACKGROUND OF THE INVENTION

1. Technical Field

The present invention relates in general to PCI local bus architectures and in particular to PCI local bus architectures which support high speed operations. Still more particularly, the present invention relates to a PCI local bus architecture which supports high speed operations utilizing the 5 V signalling environment and the 5 V PCI connector in a manner which is backward compatible with current architecture definitions.

2. Description of the Related Art

Data processing systems which provide graphical user interfaces typically experience data bottlenecks between the processor and the display peripherals under older input/output (I/O) standard architectures such as ISA and EISA. Alternative I/O architectures have been developed to eliminate this bottleneck by moving peripherals having high bandwidth requirements closer to the processor bus. One such alternative is the PCI local bus, a high performance 32-bit or 64-bit bus with multiplexed address and data lines. The mechanical, electrical, and operational standards for the PCI local bus may be found in PCI Local Bus Specification, Revision 2.1 (hereinafter "the current PCI specification"), available from the PCI Special Interest Group in Portland, Oregon and incorporated herein by reference.

The PCI local bus specification provides a processor-independent interface to add-in boards, also commonly referred to as expansion cards or adapters. Because of AC switching characteristic limitations, a PCI bus is typically configured to include six loads on the motherboard and two expansion slots or two loads on the motherboard and four expansion slots. Other configurations are possible, depending on the physical layout, loaded impedance of the motherboard, and other factors.

PCI add-in boards use an edge connector and are mounted in female connectors on the motherboard. The female connectors or slots on the motherboard reflect the signaling environment of the PCI bus. To accommodate both 5 V and 3.3 V signaling environments, two types of PCI female connectors are defined: one for the 5 V signaling environment and one for the 3.3 V signaling environment. Three varieties are specified for PCI add-in boards: a 5 V board which plugs into only the 5 V female connector, a universal board which plugs into both 5 V and 3.3 V female connectors, and a 3.3 V board which plugs into only the 3.3 V female connector. A connector keying system prevents boards from being inserted into an inappropriate slot or female connector, as illustrated in FIG. 4. Keyways 400–403 must be provided on the adapter board edge connectors at appropriate locations to accept keys 404, 405 in the female connectors or slots. Therefore the edge connector on a 5 V board 410 may only be inserted into a 5 V slot 420, and the edge connector on a 3.3 V board 430 may only be inserted into a 3.3 V slot 440. The edge connector on a universal board 450, however, may be inserted into either 5 V slot 420 or 3.3 V slot 440. The universal board is powered by a connection-dependent rail and includes components which operate in both the 5 V and 3.3 V signaling environments.

All three board types may be connected to both 5 V and 3.3 V power supplies. The distinction between board type lies in the signaling protocol. The 5 V board 410 is designed to operate only in the 5 V signaling environment, while the 3.3 V board operates only in the 3.3 V signaling environment. The distinction between board types is commercially motivated, allowing vendors transition from the 5 V signaling environment to the 3.3 V signaling environment while sparing them the expense and burden of implementing 3.3 V components which are tolerant of 5 V signaling.

Currently, the PCI local bus specification provides an architecture definition for high speed operation (up to 66 MHz), which requires use of the 3.3 V female connector. A 66 MHz adapter may utilize either the 3.3 V board or the universal board, but may not use the 5 V board since high speed operation is not defined for the 5 V signaling environment. In the 3.3 V signaling environment, a ground pin or conductor on the bus (M66EN - side B, pin 49) is utilized to indicate support for 66 MHz capability. Systems and adapters which support 66 MHz operation do not ground this ground pin. If all adapters installed on a PCI local bus do not ground the specified ground pin, the bus operates at the higher frequency—up to 66 MHz--supported by the system PCI clock. If a 33 MHz adapter, which is required to ground the specified ground pin, were installed on the same PCI local bus, the bus would operate at the lower frequency—up to 33 MHz—supported by the system PCI clock. A configuration bit is also utilized to identify 66 MHz compatible adapters.

The 5 V signaling environment is TTL compatible, while support for 3.3 V signalling is required for CMOS compliant devices. As data processing systems move from 5 V signaling to 3.3 V signaling for environmental or component density reasons, the majority of adapters will continue to utilize the 5 V type boards for some time. Therefore it would be desirable to support high speed PCI operations (33 MHz–50 MHz) utilizing the 5 V signaling environment and the 5 V PCI female connectors. It would also be desirable to provide such support in a backward compatible fashion with current 33 MHz and 66 MHz architecture definitions.

SUMMARY OF THE INVENTION

It is therefore one object of the present invention to provide an improved PCI local bus architecture.

It is another object of the present invention to provide an improved PCI local bus architecture supporting high speed operations.

It is yet another object of the present invention to provide a PCI local bus architecture which supports high speed operations utilizing the 5 V signalling environment and the 5 V PCI connector in a manner which is backward compatible with current architecture definitions.

The foregoing objects are achieved as is now described. A PCI local bus in a data processing system is operated at 50 MHz using 5 V connectors for add-in boards and a 5 V signaling environment with an appropriate timing budget. Only the 5 V add-in boards may be used for 50 MHz adapters installed in the bus. The bus is backward compatible with existing 33 MHz PCI specifications and operates at 33 MHz if a 33 MHz adapter is installed, and will operate at 50 MHz if only 50 MHz adapters and/or 66 MHz adapters which utilize the universal boards are installed.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
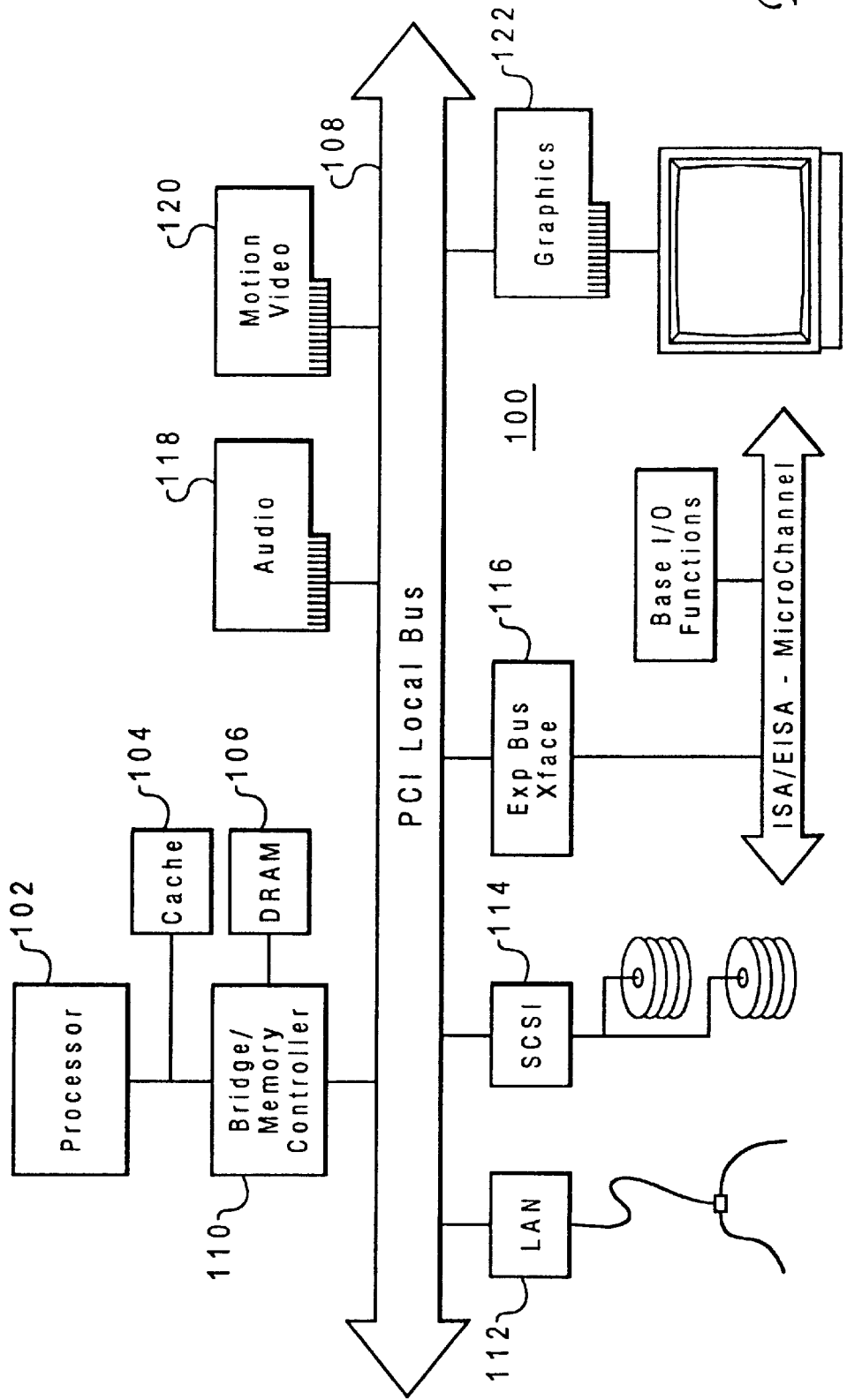
FIG. 1 depicts a block diagram of a data processing system in which a preferred embodiment of the present invention may be implemented.

With reference now to the figures, and in particular with reference to FIG. 1, a block diagram is depicted of a data processing system in which a preferred embodiment of the present invention may be implemented. Data processing system 100 utilizes the PCI local bus architecture. Processor 102, cache 104, and system memory 106 are connected to the PCI local bus 108 through PCI bridge 110. As shown in the depicted example, PCI bridge 110 may have an integrated memory controller. Additional connections to PCI local bus 108 may be through direct component interconnection or through add-in boards. In the depicted example, network adapter 112, SCSI adapter 114, and expansion bus interface 116 are connected to PCI local bus 108 by direct component connection, while sound card 118, motion video card 120 and graphics adapter 122 are connected to PCI local bus 108 by add-in boards inserted in expansion slots. Typical PCI local bus implementations will support three or four PCI expansion slots or add-in connectors. The example depicted includes four loads on the motherboard and three expansion slots.

Those skilled in the art will appreciate that the hardware depicted in FIG. 1 may vary. For example, other peripheral devices such as optical disk drives and the like also may be utilized in addition to or in place of the hardware depicted. The example depicted is not meant to imply architectural limitations. However, PCI local bus 108 in the depicted example operates in the 5 V (TTL compatible) signaling environment.

Figures 2, 3:
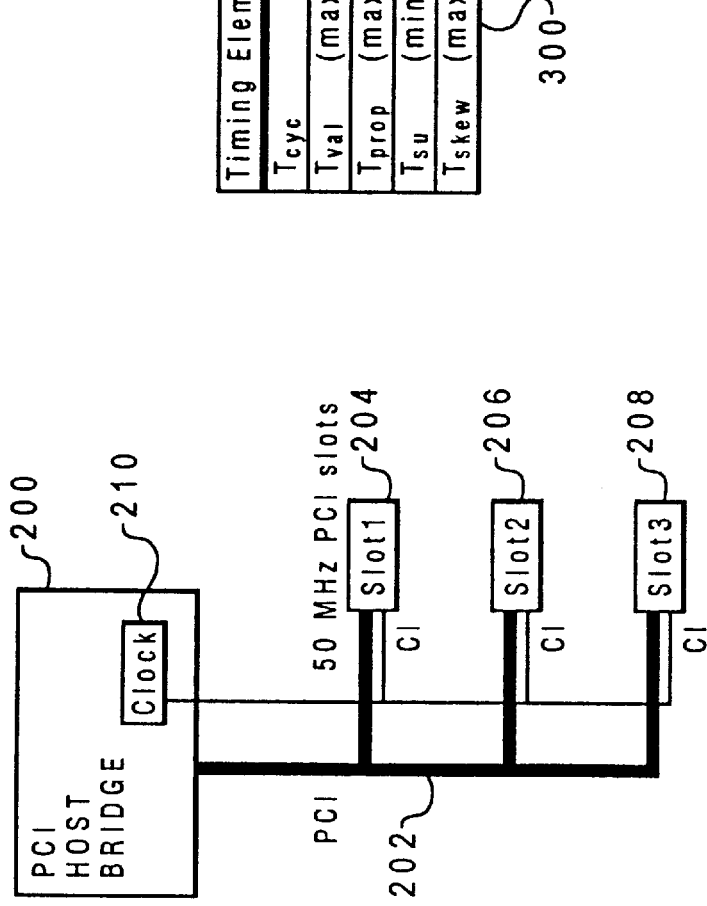
FIG. 2 is a block diagram of a PCI bridge and expansion slots in accordance with a preferred embodiment of the present invention.
FIG. 3 depicts a table of timing budgets for PCI bus operation at various bus speeds.
Figure 4:
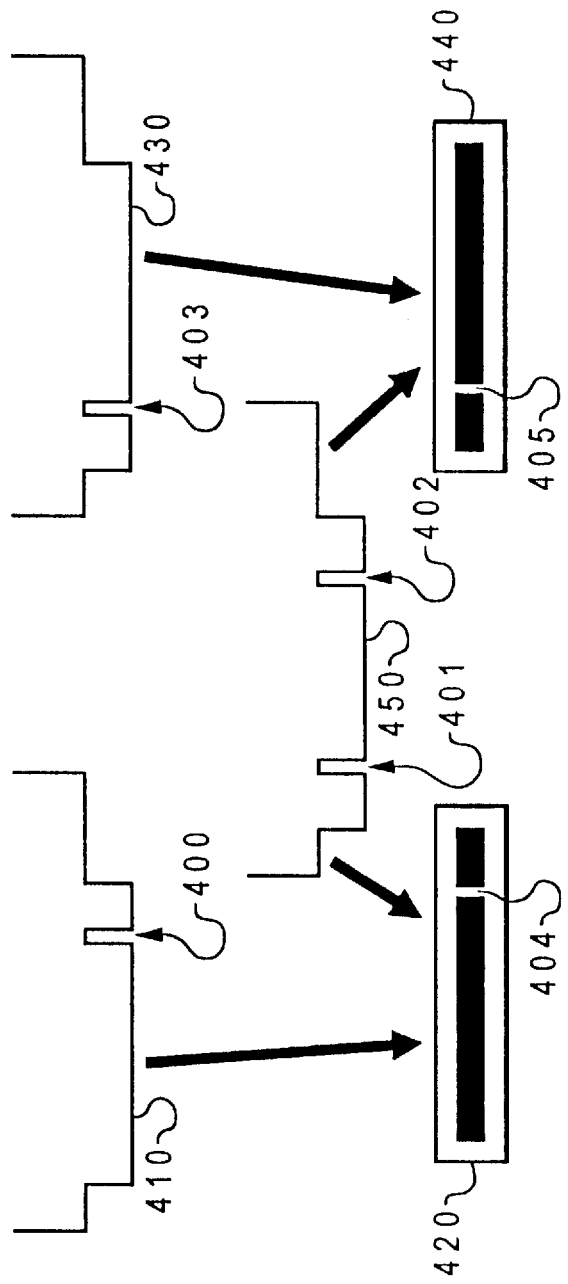
FIG. 4 is a pictorial representation of the connector keying system for PCI boards and slots.

Referring now to FIG. 2, a PCI host bridge and expansion slots in accordance with a preferred embodiment of the present invention is illustrated in a block diagram. System PCI bridge 200 provides an interface to PCI local bus 202 and 50 MHz PCI slots 204, 206 and 208. PCI local bus 202 either 32 or 64 conductors, each conductor corresponding to a defined bit of PCI local bus signals.

PCI bridge 200 utilizes a 5 V signaling environment and PCI slots 204, 206 and 208 utilize 5 V PCI female connectors. Adapters which are to be inserted into PCI slots 204, 206 and 208 are 50 MHz capable, or designed to operate only up to 50 MHz. As with 33 MHz and 66 MHz PCI specifications, adapters or add-in boards installed in PCI slots 204, 206 and 208 may be long, short, or variable short length. Like the 66 MHz PCI specification, 50 MHz PCI bridge 200 and 50 MHz adapters do not ground the specified ground pin so that PCI local bus 202 operates at 50 MHz if all adapters are 50 MHz capable and at 33 MHz if a 33 MHz adapter is installed in one of PCI slots 204, 206 and 208. PCI clock 210 can be operated at either 33 MHz or 50 MHz.

Since PCI slots 204, 206 and 208 employ 5 V female connectors, only 5 V or universal expansion boards may be inserted into these slots. A 66 MHz adapter which utilizes a universal board may be inserted into one of PCI slots 204, 206 and 208, in which case the PCI local bus 202 would operate at 50 MHz if only 50 MHz and/or 66 MHz adapters are installed. A 66 MHz adapter that employs a universal board is presumably tolerant of the 5 V signaling environment.

With reference now to FIG. 3, a table of timing budgets for PCI bus operation at various bus speeds is depicted. The PCI local bus specification defines a specific timing budget that PCI systems and adapters must meet. This timing budget is defined in the equation $$T_{cyc} > T_{val} + T_{prop} + T_{skew} + T_{su} \tag{1}$$

in which $T_{CYC}$ is the length of one clock cycle, $T_{val}$ is the valid output delay, $T_{prop}$ is the total bus propagation time, $T_{skew}$ is the total clock skew, and $T_{su}$ is the input setup time. Valid output delay $T_{val}$ and input setup times $T_{su}$ are specified by the components used on the adapter boards, while total clock skew $T_{skew}$ and bus propagation times $T_{prop}$ are system parameters.

Table 300 presents timing budgets for 33 MHz, 66 MHz, and 50 MHz operation. Two variations of the 50 MHz timing budget are presented. The 50 MHz variation designated A is suggested, purely as an example, in Table 7-7 of the current PCI specification. However that variation is not computed for 5 V signaling, but rather presumes a 3.3 V signaling environment. For 50 MHz operation with 5 V connectors in a 5 V signaling environment, the timing budget variation designated B in FIG. 3 is preferable. A preferred embodiment of the present invention should meet the timing budget values given in that variation: $T_{val}$ and $T_{prop}$ not in excess of 8 ns each; at least 3 ns allowed for $T_{su}$; and $T_{skew}$ not in excess of 1 ns.

Data processing system designers may make trade-offs in the 50 MHz timing budget values designated as B in FIG. 3 to adjust net length of the bus or the number of loads supported. In making such trade-offs, however, the sum of $T_{Val}$ and $T_{prop}$ should not exceed 16 ns and the sum of $T_{su}$ and $T_{prop}$ should not exceed 11 ns. With proper planar layout, satisfaction of the preferred 50 MHz timing budget should allow support for up to seven loads—including three expansion slots—attached to the PCI local bus. With very tight planar layout, eight loads (including four adapter slots) could be achieved.

Referring again to FIG. 2, PCI host bridge 200 should be designed to operate like a universal board, providing 3.3 V signaling as a master but tolerant of 5 V signaling as a target. Additionally, PCI host bridge 200 must also provide the 2 V up level required by 5 V targets. Components on both host bridge 200 and any 50 MHz-capable PCI adapters should satisfy the AC and DC drive for the 66 MHz specification. The bus conductor attached to host bridge 200 corresponding to the M66EN pin should be pulled up with a 5 KΩ resistor to $V_{cc}$, the input power supply voltage.

PCI clock generation circuitry 210 should be designed to generate the appropriate clock segment: 33 MHz if the 66 MHz ground pin (M66EN) is grounded and 50 MHz if the 66 MHz ground pin is not grounded. Therefore, PCI clock generation circuitry 210 should be connected to and capable of sensing the state of the 66 MHz ground pin.

The pinout for a 50 MHz adapter board should follow the 5 V pinout in the current PCI specification. Specifically, pins 12 and 13 on both sides of the board, where a keyway would be located on universal or 3.3 V boards, should be grounded. As with the 66 MHz specification, the M66EN pin—pin 49 on side B of the adapter board—may be capacitively decoupled to ground using a 0.01 µF capacitor to complete an AC return path.

Finally, PCI host bridge 200 and any 50 MHz-capable PCI adapter should identify that it may be operated at 50 MHz. This is done through read-only 66 MHz-capable flag, bit 5 of the PCI status register located on each 50 MHzcapable PCI device. Configuration software may then identify all device capabilities by checking the 66 MHz-capable flag in the status registers on all devices connected to PCI local bus 202, including both the primary and secondary status registers in PCI host bridge 200.

The PCI extension architecture illustrated in FIG. 2 defines a 5 V, 50 MHz PCI bus which is a compatible superset of the PCI specification designed to operate at a maximum of 50 MHz while utilizing 5 V connectors and 5 V signaling. This extension provides a high speed PCI bus achieving more slots PCI bus than 66 MHz PCI while utilizing 5 V connectors and supporting both 50 MHz adapters (utilizing 5 V) and 66 MHz adapters (utilizing universal boards) with operations at 50 MHz.

The standard approach for generating a high speed PCI bus that operates at a frequency lower than 66 MHz would be to design the system and adapters to the 66 MHz architecture but run the bus at a frequency lower than 66 MHz to allow for additional adapters slots. That is, a lower frequency allows for additional propagation delays which will allow an additional slot or slots, depending on the frequency used. This approach is permitted in the current definition of the 66 MHz PCI architecture.

Since the vast majority of PCI adapter boards will continue to be 5 V boards, providing a high speed 50 MHz PCI bus that utilizes 5 V connectors not only makes more high speed slots achievable, but also offers added slot flexibility. For example, 5 V 50 MHz adapters could be installed, if the need arises, on a 5 V 33 MHz bus (operated at 33 MHz). Also, 5 V 33 MHz adapters could be installed on a 5 V 50 MHz bus (again operated at 33 MHz). The 50 MHz frequency is an appropriate selection for an extension to the PCI standard, which currently defines operations only at 33 MHz and 66 MHz.

The key benefit of this approach to implementing a 50 MHz PCI bus is that systems can move forward from the 33 MHz PCI standard to a higher bandwidth at 50 MHz while retaining backward compatibility with existing 33 MHz 5 V boards, which is not necessarily possible with the standard approach to generating a high speed PCI bus operating at a frequency lower than 66 MHz. When only 50 MHz adapters are installed, the bus operates at 50 MHz. When at least one 33 MHz adapter is installed, the bus operates at 33 MHz. 50 MHz PCI extension defined shares the same protocol, signal definitions, and connector layout as the 33 MHz and/or 66 MHz PCI standards.

While the invention has been particularly shown and described with reference to a preferred embodiment, it will be understood by those skilled in the art that various changes in form and detail may be made therein without departing from the spirit and scope of the invention.

We claim:

1. A method of operating a data processing system bus, comprising:

connecting a processor to a plurality of bus conductors utilizing a PCI interface;

connecting at least one connector for an add-in board operating in a TTL compatible signaling environment to said plurality of bus conductors;

providing a clock signal to said plurality of bus conductors which is above 33 MHz; and responsive to detecting an add-in board operating in a TTL compatible signaling environment connected to said at least one connector, providing a clock signal greater than 33 MHz to said plurality of bus conductors.

2. The method of operating a data processing system bus of claim 1, wherein said step of connecting a processor to a plurality of bus conductors further comprises utilizing an interface which tolerates a 5 V signaling environment.

3. The method of operating a data processing system bus of claim 1, wherein said step of connecting at least one connector further comprises connecting multiple connectors to said plurality of bus conductors, each connector accepting an add-in board operating in a TTL compatible signaling environment.

4. The method of operating a data processing system bus of claim 1, wherein said step of providing a clock signal further comprises providing a clock signal which is above 33 MHz unless a selected bus conductor from said plurality of bus conductors is grounded and providing a 33 MHz clock signal in response to determining that the selected bus conductor is grounded.

5. The method of operating a data processing system bus of claim 1, further comprising installing at least one add-in board in said connector, said add-in board grounding a selected bus conductor of said plurality of bus conductors.

6. The method of operating a data processing system bus of claim 5, wherein said step of providing a clock signal further comprises providing a clock signal which is above 33 MHz unless a selected bus conductor from said plurality of bus conductors is grounded and providing a 33 MHz clock signal in response to determining that the selected bus conductor is grounded.

7. The method of operating a data processing system bus of claim 1, wherein said step of providing a clock signal further comprises providing a 50 MHz clock signal.

8. The method of operating a data processing system bus of claim 1, wherein said step of connecting at least one connector further comprises connecting at least one 5 V connector.

9. A data processing system bus, comprising:

a PCI interface connecting a processor to a plurality of bus conductors;

at least one connector for an add-in board operating in a TTL compatible signaling environment connected to said bus conductors; and a clock operating above 33 MHz and providing a clock signal to said bus conductors, wherein said clock, responsive to detection of an add-in board operating in a TTL compatible signaling environment connected to said at least one connector, provides a clock signal greater than 33 MHz to said conductors.

10. The data processing system bus of claim 9, wherein said PCI interface tolerates 5 V signaling.

11. The data processing system bus of claim 9, wherein said at least one connector further comprises multiple connectors add-in boards operating in a TTL compatible signaling environment connected to said plurality of bus conductors.

12. The data processing system bus of claim 9, wherein said clock is capable of operating at 33 MHz.

13. The data processing system bus of claim 9, further comprising at least one add-in board installed in said connector, said add-in board grounding a selected bus conductor of said plurality of bus conductors.

14. The data processing system bus of claim 13, wherein said clock detects said grounding of said selected bus conductor and operates at 33 MHz.

15. The data processing system bus of claim 13, wherein said clock operates at 50 MHz unless the selected bus conductor is grounded.

16. The data processing system bus of claim 9, wherein said at least one connector accepts a 5 V add-in board.

17. The data processing system bus of claim 9, wherein said clock operates at 50 MHz.

* * * * *

UNITED STATES PATENT AND TRADEMARK OFFICE
CERTIFICATE OF CORRECTION

PATENT NO. : 5,774,706
DATED : June 30, 1998
INVENTOR(S) : Neal et al.

It is certified that error appears in the above-identified patent and that said Letters Patent is hereby corrected as shown below:

Abstract: Line 1 should read "A PCI local <u>bus in a data</u> processing system..."

Column 2, Line 2: Should read "... ,allowing vendors <u>to</u> transition..."

Column 3, Line 51: Should read "<u>comprises</u> either 32 or 64 conductors,..."

Column 4, Line 14: Please change "$T_{cyc} > T_{val}$" to --$T_{cyc} \geq T_{val}$--

Column 5, Line 18: Should read "achieving more slots <u>per</u> PCI bus..."

Signed and Sealed this

Eighth Day of December, 1998

Attest:

BRUCE LEHMAN

*Attesting Officer*  *Commissioner of Patents and Trademarks*